United States Patent
Kumar et al.

(10) Patent No.: US 6,278,993 B1
(45) Date of Patent: Aug. 21, 2001

(54) METHOD AND APPARATUS FOR EXTENDING AN ON-LINE INTERNET SEARCH BEYOND PRE-REFERENCED SOURCES AND RETURNING DATA OVER A DATA-PACKET-NETWORK (DPN) USING PRIVATE SEARCH ENGINES AS PROXY-ENGINES

(75) Inventors: Srihari Kumar; Sreeranga P. Rajan, both of Santa Clara, CA (US)

(73) Assignee: Yodlee.com, Inc., Redwood Shores, CA (US)

( * ) Notice: Subject to any disclaimer, the term of this patent is extended or adjusted under 35 U.S.C. 154(b) by 0 days.

(21) Appl. No.: 09/497,089

(22) Filed: Feb. 3, 2000

Related U.S. Application Data

(63) Continuation-in-part of application No. 09/323,598, filed on Jun. 1, 1999, which is a continuation-in-part of application No. 09/208,740, filed on Dec. 8, 1998.

(51) Int. Cl.[7] ............................. G06F 15/00; G06F 17/30
(52) U.S. Cl. .................................. 707/3; 707/501; 707/5
(58) Field of Search ..................... 707/1–10, 100–104, 707/500–534; 345/326–335; 709/200–217

(56) References Cited

U.S. PATENT DOCUMENTS

| | | | |
|---|---|---|---|
| 5,793,966 | * 11/1998 | Amstein et al. | 709/203 |
| 5,832,494 | * 11/1998 | Egger et al. | 707/102 |
| 5,991,756 | * 11/1999 | Wu | 707/3 |

OTHER PUBLICATIONS

O'Leary, Mick, "NewsWorks, brings new depth to Web news; the site excels with unique sources and value–added editorial features", Information Today, v14, p. 10, Dec. 1997.*

* cited by examiner

*Primary Examiner*—Hosain T. Alam
*Assistant Examiner*—Alford W. Kindred
(74) *Attorney, Agent, or Firm*—Donald R Boys; Central Coast Patent Agency, Inc.

(57) ABSTRACT

A search function is provided for Internet searching capable of searching to greater depth than conventional search functions. The new function tests returned electronic documents from a first search for a second search function, and, finding a second function, transfers at least a form of first search criteria into the second search function, then initiated the second function, and returns at least addresses of documents found by the second function into the first function. In a preferred embodiment a search function according to the invention is provided by a subscription portal server, and operates by proxy, initiated and controlled by subscribers. In this form, primary searches may be limited to destinations registered to specific subscribers using the function.

11 Claims, 11 Drawing Sheets

METHOD AND APPARATUS FOR EXTENDING AN ON-LINE INTERNET SEARCH BEYOND PRE-REFERENCED SOURCES AND RETURNING DATA OVER A DATA-PACKET-NETWORK (DPN) USING PRIVATE SEARCH ENGINES AS PROXY-ENGINES

CROSS-REFERENCE TO RELATED DOCUMENTS

The present invention is a continuation in part (CIP) to patent application Ser. No. 09/323,598 entitled "Method and Apparatus for Obtaining and Presenting WEB Summaries to Users" filed on Jun. 1, 1999, which is a CIP to patent application Ser. No. 09/208,740 entitled "Method and Apparatus for Providing and Maintaining a User-Interactive Portal System Accessible via Internet or other Switched-Packet-Network" filed on Dec. 8, 1998, disclosures of which are incorporated herein in their entirety by reference.

FIELD OF THE INVENTION

The present invention is in the field of Internet navigation and data gathering over a DPN network and pertains more particularly to a method and apparatus for searching for and returning data associated with URL's not indexed in traditional search engine databases, by using secondary proxy engines.

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to Universal Resource Locators (URL's), also termed information pages or WEB pages, stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security, that may vary from service to service. Additionally, many users at their own volition may choose different passwords for different sites so as to have increased security, which in fact also increases the number of passwords a user may have.

Another issue that can plague a user who has many passworded subscriptions is the fact that they must book-mark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor and described in the related case listed under the cross-reference to related documents section provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URL's in the form of hyperlinks such that a user may click on a hyperlink and navigate to the page wherein log-in, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URL's for specific content if such pages are cached somewhere in their presentable form such as at the portal server, or on the client's machine.

An enhancement to the personalized system described above allows a software agent termed a gatherer agent (browser navigation control) to, in cooperation with a search function, navigate by proxy to any user-entered URL and return updated data back to the user in the form of an HTML information pace, which appears in the user's browser window. The enhancement is accomplished with the use of site-logic scripting based on pre-known information about the URL or URL's from which a user wishes to obtain data. In this way, current data specifically requested by a user may be found and retrieved for the user.

The process described above is initiated by a user query that is entered into a search function dialog box provided with a user's personal portal page. The query may be presented in natural language adding a level of user friendliness to the process. Moreover, auto log-in to password protected sites may be performed on behalf of users by virtue of the system's compilation and storage of user and WEB-site related data.

A limitation exists in the personalized system described above in that the search function may not search beyond the indexed or known URLs listed in the service database and attributed to a requesting user. That is to say that the search function cannot proceed beyond the first level of WEB site depth. Therefore, manual navigation must still be performed by a user who desires to obtain data referenced at a deeper level than in an indexed or registered URL. Of course, a user practicing the above system may physically register any new URLs with the service such that they may be included in the search criteria and site logic may be developed for obtaining summary data contained in the new URLs. However, when performing a general search, a user may not know the URL where the desired data is held.

In a general sense, as opposed to the personalized system described above, the current technology of searching URLs over a DPN such as the Internet with a search engine involves entering a query into a search dialog box and submitting the query to a server hosted by the provider of the search function. The requested data is compared to data held in a database containing cached URLs, which may contain data matching a query. Matching URLs (URLs with data content matching a query) are then returned to a user's browser window for browsing and selection as is generally known in the art.

There are many different methods and criteria used by search engines for searching out data on the Internet. Most typical is the use of key words or phrases that are used to find matches in text contained on an indexed WEB page (URL). Other methods include searching by site, searching for video, searching for photographs, searching for audio, and so on.

The above technology is limited in a general sense as described above by a fact that all URL pages containing information which may be desired by a user, are not listed in conventional search engine databases. In fact, there are a vast number of URL resources that are maintained on the Internet that are not listed in any search engine database and therefore may not be found through a query-type search method.

For example, a main page having a URL and hosted by an enterprise may contain several links to pages that contain additional information.

However, only the main page of the site is typically indexed on any given search-engine list unless a host of the site or other entity submits the additional URLs to be included in a database held by the enterprise hosting the search engine. Therefore, in order to obtain the additional data from un-indexed sites, a user must navigate to additional sites from a "jump-off page" found during the original search.

Many enterprises, especially companies hosting many pages, provide a convenient search engine function embedded into a page at a main URL, which is indexed in the conventional search-engine databases. In this way, a user may search for the main site, invoke the returned link, and then use the provided private search engine to explore the additional pages or look for additional data related to the site as a whole. Such a WEB site may be a company or enterprise site comprising many related WEB pages.

When a user invokes a private search function on a main page, he must enter a new query into the private search engine to look for the additional data. He or she is no longer using the original search engine to look for the data. Moreover, the private search engine provided at a site's main URL may function by different rules then the original search engine requiring a user, in many cases, to restructure the original query.

In the personalized system described further above wherein pre-knowledge exists about the user and WEB page site-logic is known pertaining to how data is hosted at the service-site marked by a known URL, the limitation described in a general data-search system still exists. That is, URLs may not be found if they are not pre-known or indexed.

What is clearly needed is a method and apparatus that enables a search engine to find and obtain data from URLs that are not indexed by a search engine database or otherwise pre-known to a requesting user or search-hosting service. A method and apparatus such as this would allow a user to obtain data that would otherwise have to be obtained by further browser navigation.

SUMMARY OF THE INVENTION

In a preferred embodiment of the present invention a method for extending an on-line Internet search beyond pre-referenced sources is provided, comprising steps of (a) entering a first search criteria in a first search function; (b) initiating the first search function; (c) returning in the first search function a pre-referenced first document having data associated with the first search criteria; (d) testing the first document for an embedded second search function; (e) on finding a second search function in the first document, automatically entering at least a form of the first search criteria in the second search function; and (f) returning addresses in the first search function for documents found through the second search function.

In one embodiment the first search function allows natural language in entering search criteria, and further comprises a parsing step for parsing criteria input for significant words and phrases for criteria matches. The first function, in some embodiments in step (e), tests the second search function for criteria rules, and amends the first search criteria to conform to the criteria rules.

In some embodiments the first search function is provided by a subscription portal service, an is operated by proxy by subscribers. In some of these embodiments the first search function is limited in step (c) to returning first documents pre-registered to a specific subscriber invoking the first search function.

In another aspect of the invention an Internet search application is provided, comprising a first search module having a first criteria interface for entry of a first search criteria; an inspection function for identifying a second search module in a returned electronic document, the second search module having a second criteria interface; and an entry module for entering the first search criteria into the search criteria interface of the second search module. The new search function is characterized in that the search application, upon entry of a first search criteria in the first criteria interface, returns at least one electronic document having a match to the first search criteria, inspects the document for the second search module, and transfers at least a form of the first search criteria into the second criteria interface.

In preferred embodiments the Internet search application further initiates the second search module after transfer of search criteria, and returns at least addresses of documents found by the second search function in the first search function.

In some cases the first search module allows natural language criteria entry, and parses entries for significant words and phrases for matching to content in electronic documents returned. In some cases as well, the first search module, in step (e), tests the second search module for criteria rules, and amends the first search criteria to conform to the criteria rules.

In some cases the first search module is provided by a subscription portal service, an is operated by proxy by subscribers, and in some of these embodiments the first search module is limited to returning first documents pre-registered to a specific subscriber invoking the first search function.

In embodiments of the present invention taught in enabling detail below, for the first time, a search function is provided for Internet browsing that is capable of invoking secondary and private search functions in documents returned by a first search operation, and finding documents at further depth through the invoked functions.

BRIEF DESCRIPTION OF THE DRAWING FIGURES

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
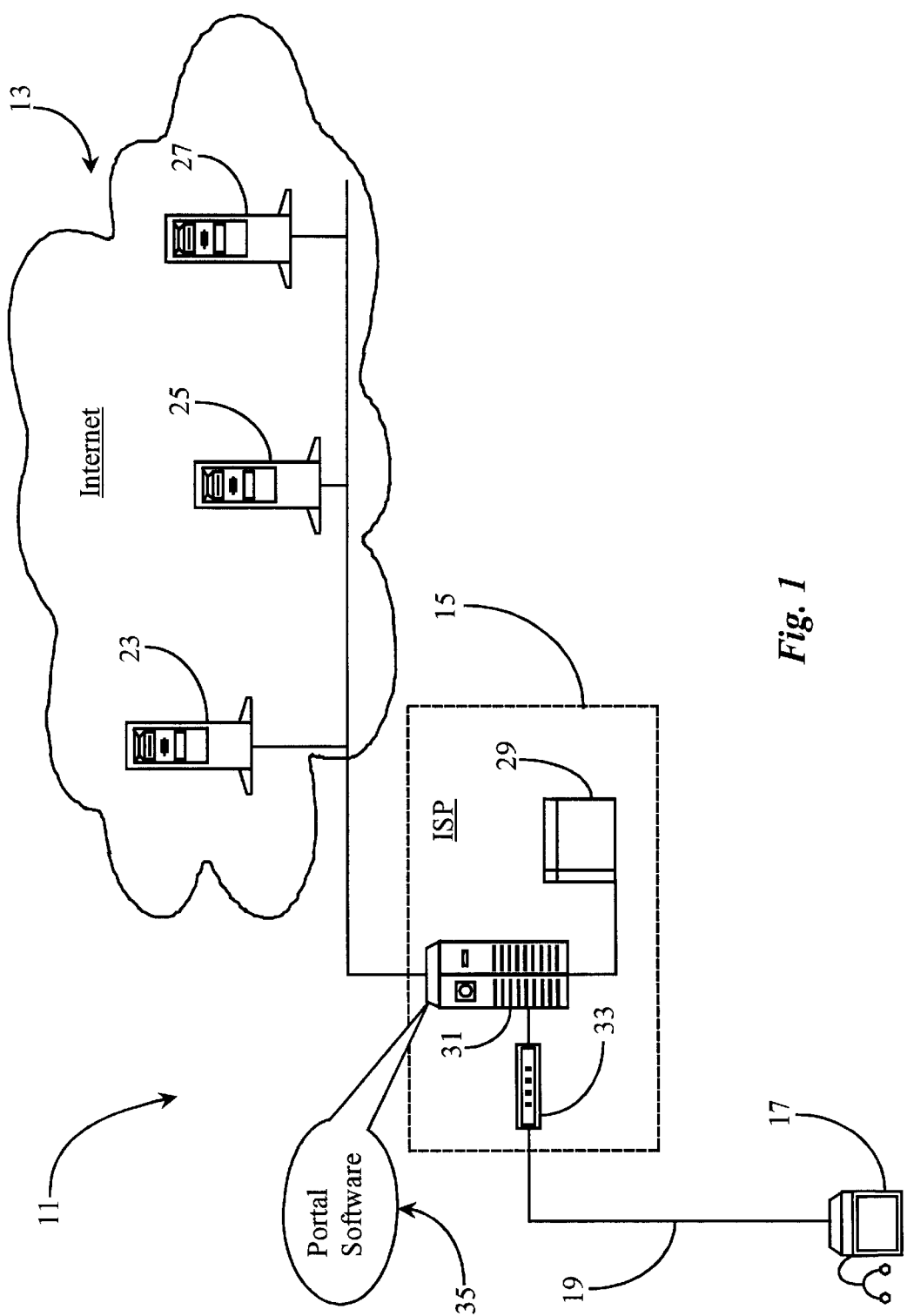
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
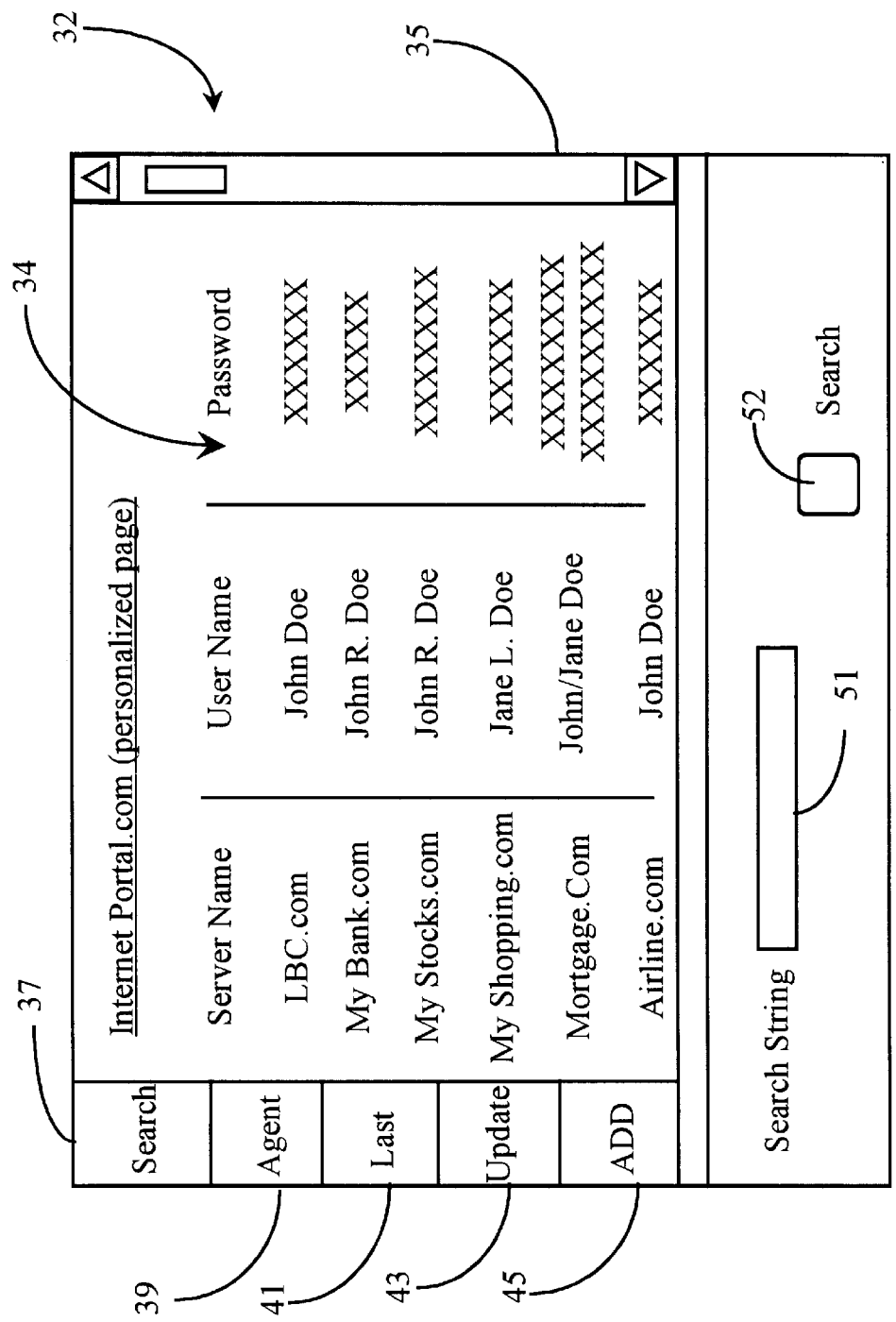
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke., etc.), and the Password-All suite will then enter a new passthrough in the user's Password. All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password. All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise riot engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
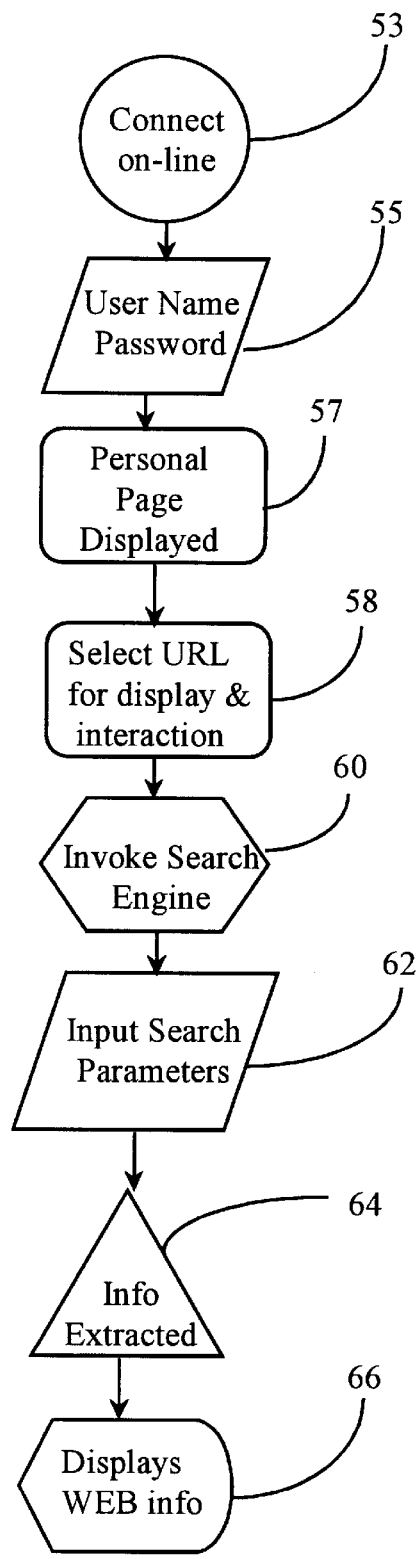
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password For both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for WEB Summaries

In another aspect of the present invention, a software agent, termed a gatherer by the inventors, is adapted to gather and return summary information about URL's according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, log-in names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent log-in function for the subscriber while jumping the subscriber to the subject destination.

Referring again to FIG. 2, an interactive list 34 containing user-entered hyperlinks and a set of interactive tools is displayed to a subscriber by portal software 35 of FIG. 1. One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2 ); and may be provided as a separate agent or gatherer to run with portal software 35; or may, in some embodiments, be provided as a standalone service that is separate from portal software 35.

Figure 4:
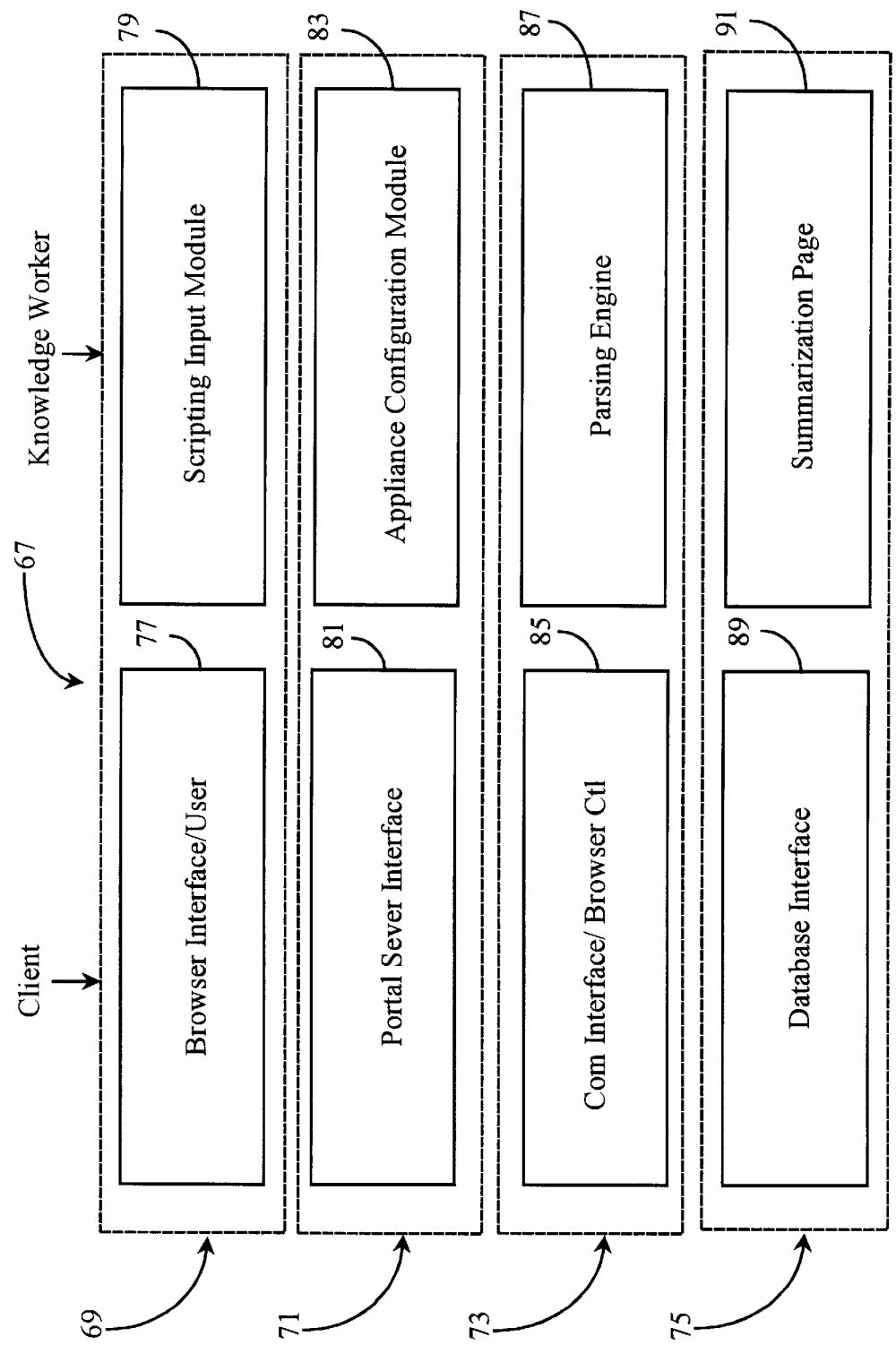
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, in one embodiment, be integrated with portal software 35 of FIG. 1 and be provided in the form of a software module separate from agent 39 (FIG. 2). In another embodiment, gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of submodules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform it's function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment, one script may contain site logics for a plurality of WEB pages and instructions for specific navigational instruction and password or log-in information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user log-in information may be supplied at the client's end when a request is made. For example, an encrypted password may be supplied by a client plug-in and gatherer 67 may temporarily borrow the user's encryption key when auto log-in is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives it's instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from amazon™.com. The hyperlinks and/or actual URL's required for navigation are not shown, but may be assumed to be included in the template script. In this example, a company name Yodlee (known to the inventors) is used in the script for naming object holders and object containers, which are in this case Active X™ conventions. In another embodiment, Java™ script or another object linking control may be used. The scripted template logic example is as follows:

```
# Site amazon.orders.x - shows status of orders from Amazon
login ( 7 );
get( "/exec/obdios/order-list/" );
my @tables = get_tables_containing_text( "Orders:" );
my $order_list = new Yodlee::ObjectHolder( 'orders' );
$order_list->source( 'amazon' );
$order_list->link_info( get_link_info() );
my @href_list;
my @container_list;
foreach my $table ( @tables ) {
        my @rows = get_table_rows();
    foreach my $i (0 . . $#rows ) {
            select_row ( $i );
            my $text = get_text( $rows[ $i ] );
            next if $text =~ /Orders:|Status/;
            my @items = get_row_items();
            next unless @items >= 4;
            my( $order_num, $date, $status );
            select_cell( 1 );
            $order_num = get_cell_text();
            my $href = get_url_of_first_href( get_cell() );
            select_cell( 2 );
            $date = get_cell_text();
            select_cell( 3 );
            $status = get_cell_text();
            next unless defined $order_num and defined $date and
            defined
$status;
            $order = new Yodlee::Container( 'orders' );
            $order->order_number( $order_num );
            $order->date( $date );
            $order->status( $status );
            $order_list->push_object( $order );
            if( defined $href ) {
                push( @href_list, $href );
                push( @container_list, $order );
    foreach my $i ( 0 . . $#href_list ) {
            get( $href_list[ $i ] );
            @tables = get_tables_containing_text( "Items
            Ordered:" );
    foreach my $table ( @tables ) {
            my @rows = get_table_rows();
    foreach my $j ( 0 . . $#rows ) {
            select_row( $j );
            my $href = get_url_of_first_href( get_row() );
            next unless defined $href;
            my @child_list = get_children( get_row(), 'a' );
            next unless defined $child_list[ 0 ];
            my $text = get_text( $child_list[ 0 ] );
            $container_list[ $i ]->description( $text );
        }
    }
}
result( $order_list );
```

The above example is a script that instructs control 85 and parser 87 to navigate to and obtain data from Amazon™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment, metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention, gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site) that contains the "where to go" and "what to get" information according to site logic, user input, and known information.

Alternatively, if a user requests a summary about data on one of his sites such as, perhaps, current interest rates and re-finance costs at his mortgage site, the service may at it's own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes it's site logic parameters, in which case, the new logic must be accessed and any existing templates must be updated, or a new template may be created for the site. The templates contain site-specific script obtained from the site and stored by the knowledge workers. In one embodiment, companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user whishes to subscribe, or register at a new site, only the identification of the site is required from the user as long as his pertinate information has not changed. If a new password or the like is required, gatherer 67 through control module 73 may present log-in or password codes from a list of alternative codes provided by a user. In another embodiment, a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-log-in and data access may still be performed transparent to a user.

In another embodiment, plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites. A logical flow of an exemplary request/response interaction is provided below.

Figure 5:
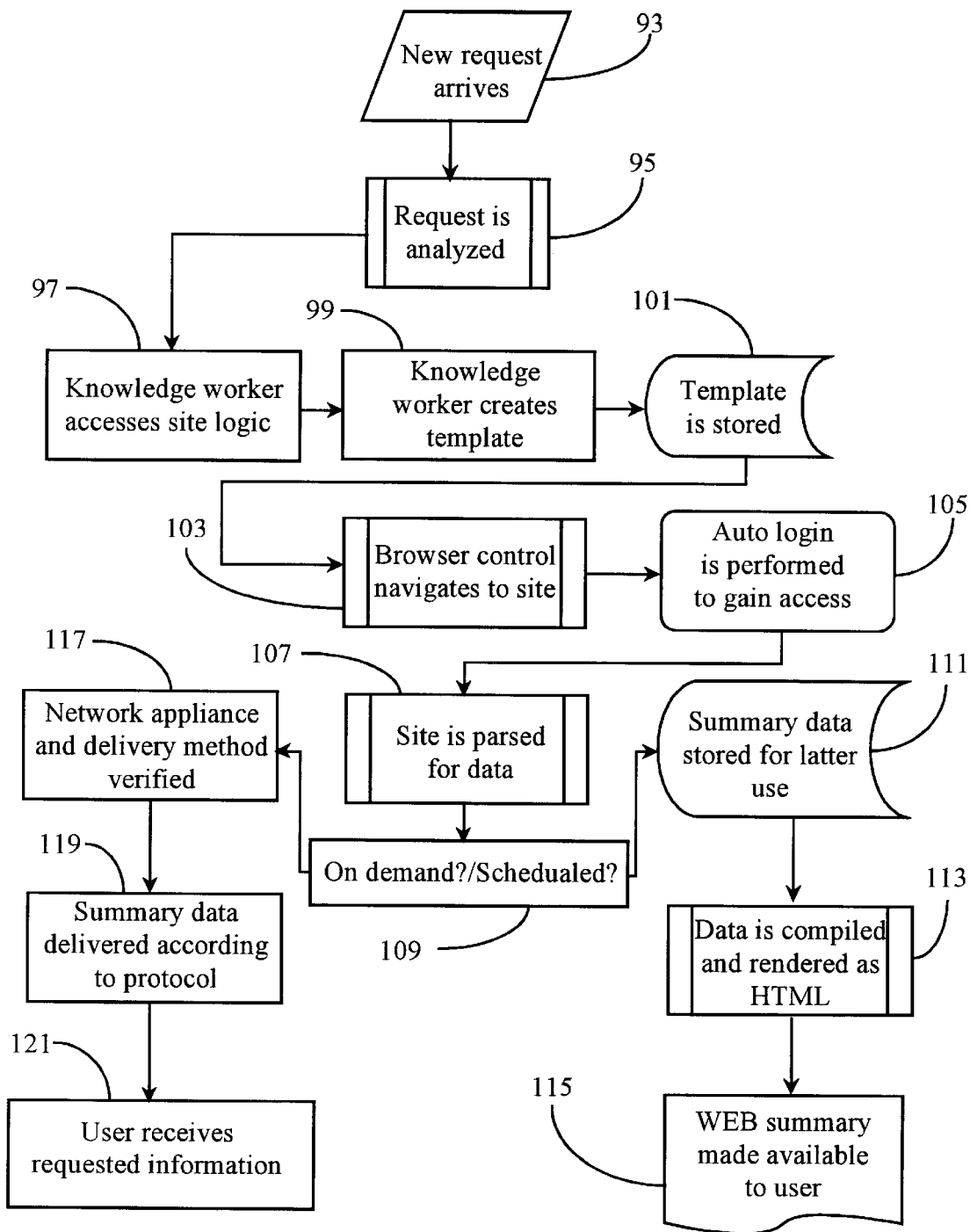
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order). It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URL'S. For example, if the request involves a plurality of URL's, then all site logics for those URL's are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URL's. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URL's, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URL's for the purpose of gathering summary data. If a timing function is attributed to the template stored in step 101, then the template may self execute and call up the browser function. In another embodiment, the knowledge worker may notify the browser control to get the template for it's next task. In some embodiments, a plurality of controls may be used with one template as previously described.

In step 105, automatic log-in is performed, if required, to gain access to each specified URL. In step 107, a specified WEB-page is navigated to and parsed for requested data according to the logic on the template. If there are a plurality of WEB-pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for latter use in step 111. In step 113, the summary data is rendered as HTML if not already formatted, and displayed in the form of a summary WEB-page in step 115. The summary page may be posted for access by a user at a time convenient to the user (pull), or may be pushed as a WEB-page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user) is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
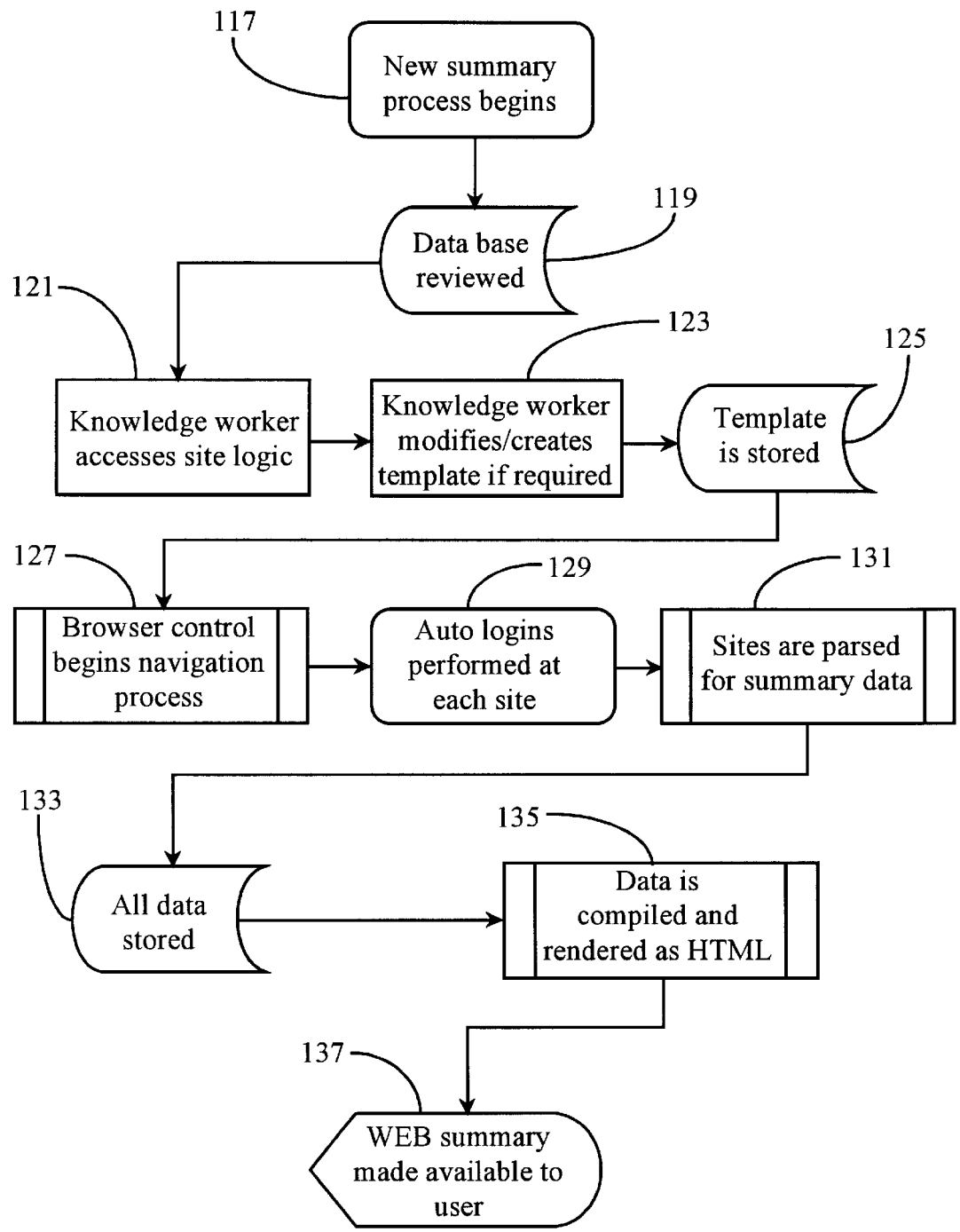
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto log-ins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or log-in information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of it's existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

The method and apparatus also may be practiced in a language and platform independent manner, and be implemented over a variety of scalable server architectures.

Deeper-Level Searching by Proxy

As described in the background section, a conventional search function cannot search beyond a first level of WEB-site depth. A URL must be pre-known either to a user or to a service providing data-search capability before it may be returned as a result of a search. Vast numbers of URLs are not indexed into any search engine databases and therefore cannot be found by traditional key-word searching. An overview of prior art implementation of a traditional data-search process as practiced on the Internet is provided below.

Figure 7:
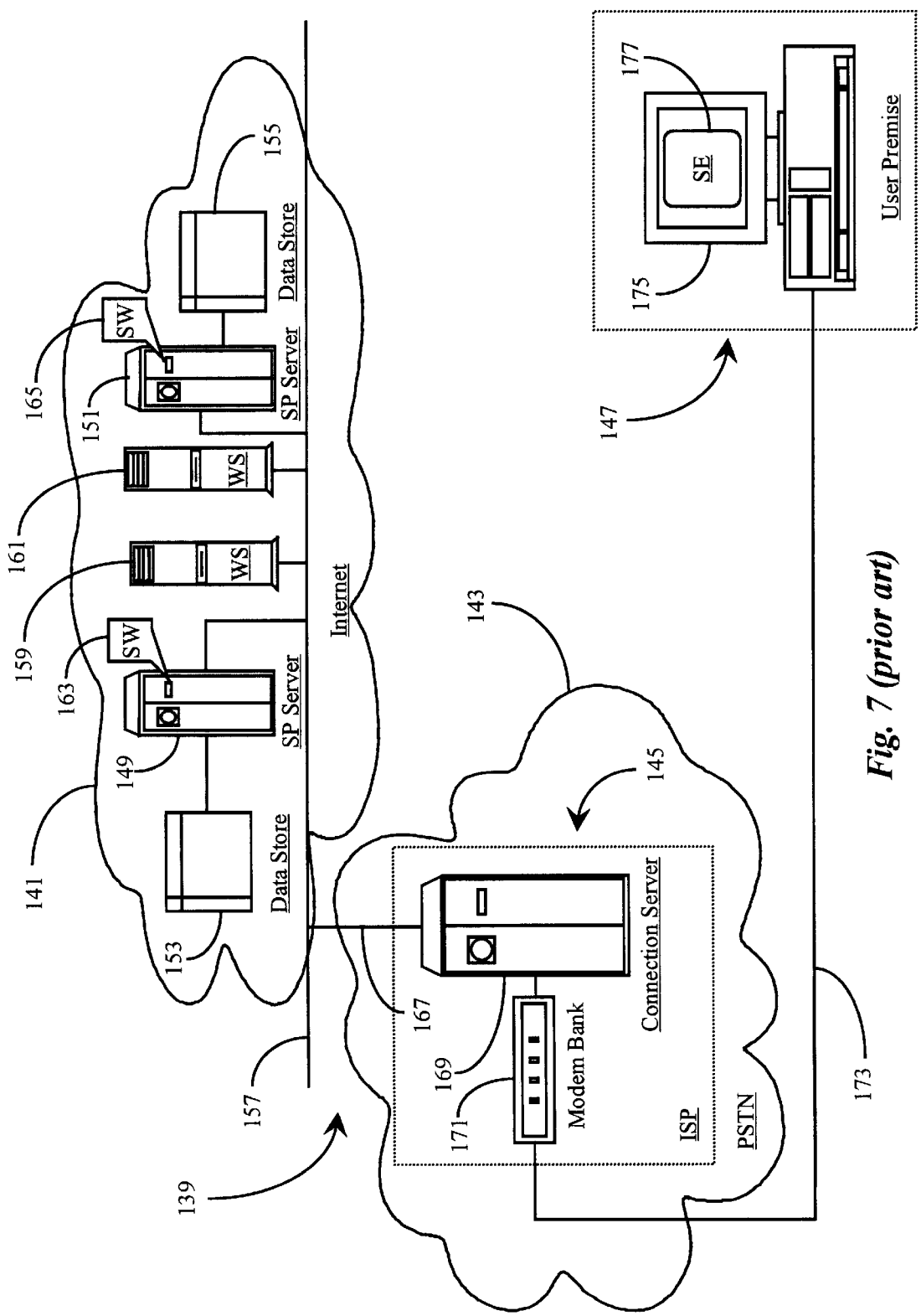
FIG. 7 is an architectural overview of a system navigated to search for data on a DPN network according to prior art.

FIG. 7 is an architectural overview of a system employing a conventional data-search process for on a DPN network according to prior art. A communication network 139 is exemplified in this prior-art example as a common architecture for facilitating network data searches. Network 9 comprises the well-known Internet network 141, a well-known public-switched-telephony network (PSTN) 143, an Internet Service Provider (ISP) 145, and an exemplary user premise 147.

It is widely known and accepted in the art that Internet 141, PSTN 143, ISP 145, and user premise 147 represent a communication architecture (network 139 ) commonly used by the public for searching out and obtaining network-sourced data.

Internet 141 has an Internet backbone 157 illustrated therein and intended to represent the many lines and connection points making up the Internet network as a whole. Two search provider (SP) servers, server 149 and server 151 are illustrated as connected to backbone 157, and are adapted to provide Internet data-search services to the public at large as is generally known in the art. A search provider is defined, for the purpose of this example, as an enterprise engaging in providing WEB-sourced data made accessible to users through server capabilities. Altavista™ and Yahoo™ are well-known examples of search providers Such enterprises may also provide other services such as portal services and so forth.

SP server 149 has a data store 153 connected thereto by a data link. Data store 153 is adapted to contain cached URLs, which are compiled and indexed according to enterprise rules and which are accessible through a search-engine application illustrated as SW 163 running on server 149. Data store 153 may be any kind of suitable data repository capable of storing large amounts of data. Data store 153 is typically an on-line data repository which is accessed by server 149 when matching data-search queries to data contained in data store 153.

SP server 151, a connected data store 155, and an instance of SW 165 may be described as replicated components of server 149, data store 153, and SW 163 accept that a differing, enterprises may host such services. For example, Altavista™ may host server 149, data store 153, and SW 163 while Excite™ may host server 151, data store 155 and SW 165. Slight differences may exist between the separate enterprises hosting the aforementioned equipment. Therefore, physical differences may exist in the services offered as well as in SW and hardware implementations. The inventor chooses to focus only on the standard data-search functionality common to both equipment and SW groups. Therefore, each group is represented with identical capabilities in this example.

Two WEB servers (WS), 159 and 161 are illustrated as connected to backbone 157 in Internet 141. WSs 1.59 and 161 are adapted as normal file servers as known in the art. Servers 159 and 161 host electronic information pages addressed by URLs and are adapted to serve them on authorized request from any other network-connected node. Electronic WEB-pages are typically formatted in well-known Hyper-Text-Mark-up Language (HTML). The URL is actually the unique server address of an information page as is well known.

PSTN 143 represents the most common telephony network used to access Internet 141. PSTN 143 may be assumed to contain all of the required equipment for enabling telephony communication and connection including such as telephony switches, routers, service control points (SCP), network bridging stations, and so on.

ISP 145 is provided within PSTN 143 and is adapted to perform Internet-access services as known in the art. ISP 145 comprises a modem bank 171, represented herein by a single modem icon, and an Internet connection server 169 adapted to connect subscribers to Internet 141. Connection server 169 is illustrated as having connection to Internet backbone 157 by an Internet access line 167. Access line 167 may be any suitable connection means known in the art for maintaining Internet connectivity for a plurality of users accessing Internet 141 through server 169.

User premise 147 comprises a personal computer (PC) 175, which is adapted by SW and hardware implementation for communication on Internet 141. PC 175 is illustrated as connected to modem bank 171 by an Internet access line 173, which may be any connection means known in the art for providing Internet access to user premise 147. Examples include normal plain old telephone service (POTS) line, Integrated Services Digital Network (ISDN) line, Cable/Modem line and so on. In this example, PC 175 uses a dial-up method and ISP 145 to access Internet 141 as is most common in the art.

A browser application 177 is provided and illustrated as executing on PC 175 indicating that PC 175 is engaged in a browsing session on Internet 141. A search engine, represented within browser 177 by the letters SE is incorporated by a user operating PC 175 for the purpose of data search as is known in the art. A user operating PC 175 and connected to Internet 141 through ISP 145, as illustrated by the described connections, may invoke an SE through application 177 and thus connect to one of SP servers 149 or 151 in Internet 141. The exact server connection will depend on the proprietary search option listed in application 177 and selected by a user. Using the examples presented above, if the search option chosen is Altavista™, then PC 175 will be connected to SP server 149 hosted by Altavista™. If the chosen option is Excite™, then PC 175 would be connected to SP server 151 hosted by Excite™. Such methods are known in the art and many different search providers hosting separate data services may be represented for selection in application 177.

Assuming that a user operating PC 147 is connected to Internet 141 through one of several methods provided as examples above, a data search may be initiated from application 177 by invocation of search option SE provided as a link in application 177. Assuming that upon invocation of SE in application 177, a connection to SP server 149 is made, then an interactive HTML page representing a data-search interface is served to the connected user. SW 163 running on server 149 then processes any initiated data search according to a query entered into a search dialog box provided with the HTML interface as is known in the art.

In process of a query from a user operating PC 175, SP server 149 running SW 163 checks data store 153 for any URL pages contained therein that have data content associated therewith that matches (to some extent) criteria according to the entered query. As described in the background section, a query may be a key word, a series of key words, a phrase or the like. Server 149 running SW 163 returns any matching URL's from data store 153, where they appear in listed fashion in application 177. URL results are often termed "hits" in the art. There may be only a few or a great number of "hits" returned depending on the nature (broad or narrow) of the original query entered, and the richness of the Internet content. Each hit represents a hyper-link to an electronic WEB page that may be hosted, in this example, by server 159 or server 161, or any other network-connected server. Therefore, invoking a returned URL initiates navigation by browser 177 to either server 159 or 161 wherein the updated version of the HTML page is served. At this point the aforementioned user is negotiating with server 159 or 161.

There are other possible aspects of connection and communication represented in this prior-art example as well. For example, an enterprise hosting SP server 149 may through agreement forward a query to the enterprise hosting SP server 151 such that data store 155 may be included in a data search. With this type of cooperation, many resources may be accessed in a shared sense. Therefore, if an original query does not return a URL from one data store, an option may exist for searching data stores hosted by other enterprises without a user having to close one connection and open another. This process is fairly recent and is termed meta-searching in the art.

A limitation of the prior art exists in that software instances 163 and 165 are adapted only to provide URL's and data that is indexed in either data store 153 or data store 155. An enterprise hosting server 159 or server 161 may also have connected data-stores containing information related to electronic pages that are hosted therein. Such data stores hold data on a deeper level of WEB-site depth and may be accessed through manual navigation from a main URL or through a private search function (limited to searching data hosted by the enterprise) provided as an embedded module in one or more of the hosted main pages. Software instances 163 and 165 cannot provide access to a private search function unless it is functionally available in either server 149 or server 151. A user must invoke the private search function after he or she is served the hosting page in order to search a private data-store. Moreover, a user must often restructure a query for application to the new search engine soilware as the query rules may be different than those associated with SW 163 or SW 165.

It can be seen, in a general sense, by one with skill in the art that the prior-art data search methods illustrated in this example are limited both by the fact that only data indexed by URL may be found, and by the fact that additional deeper-level data searches must be performed manually through user-initiated browser navigation.

The inventor provides a unique method and apparatus that enables a deeper-level data search to be accomplished through an original SE application wherein no query re-entering by a user or additional browser navigation by a user is required. Such a method and apparatus is described in enabling detail in examples below.

Figure 8:
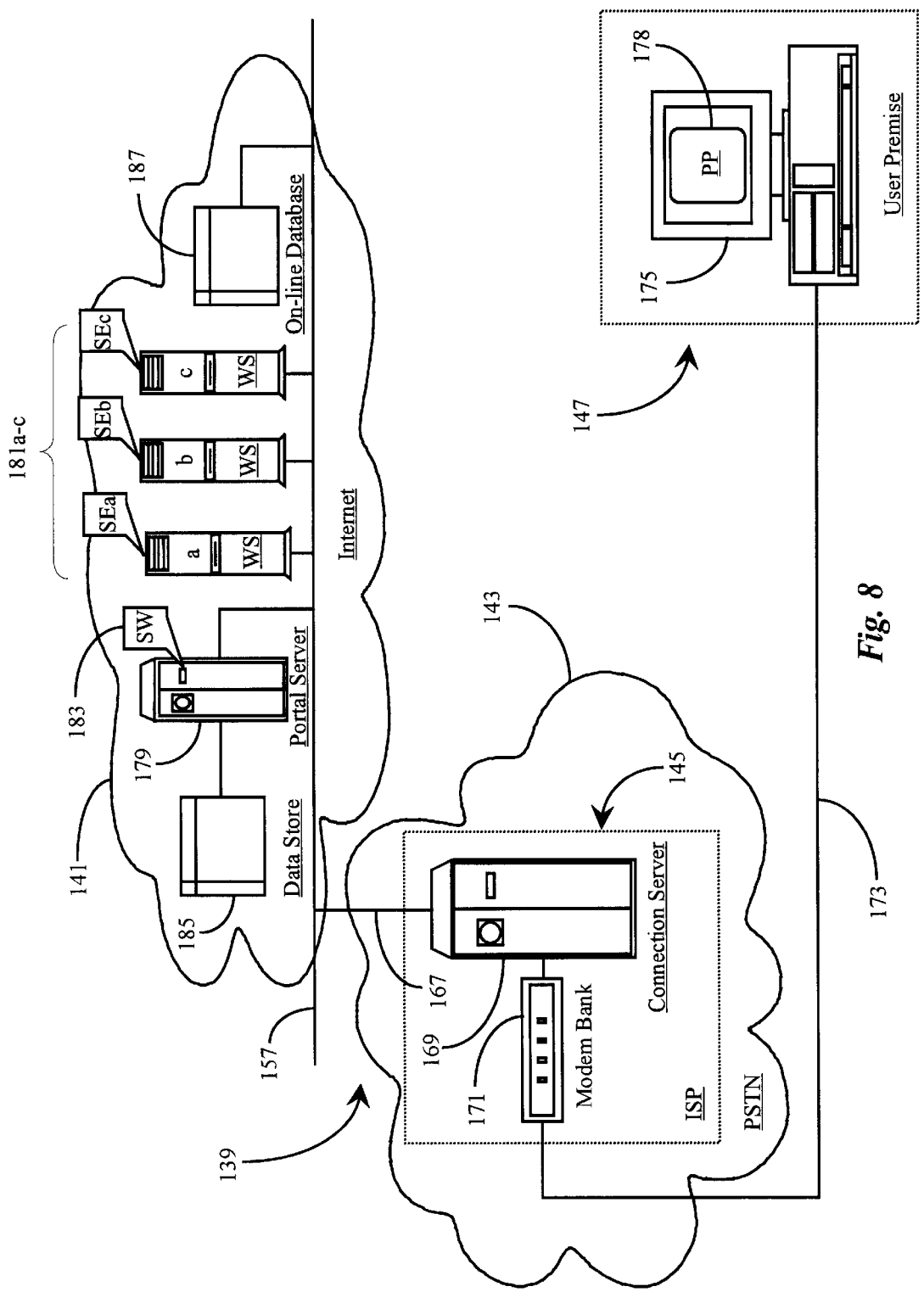
FIG. 8 is an architectural overview of a system employing a personalized search method for data on a DPN network according to an embodiment of the present invention.

FIG. 8 is an architectural overview of a search method for data on Internet 141 according to an embodiment of the present invention. Much of the architecture and connection means illustrated in this preferred embodiment mirror those of the prior-art example of FIG. 7. Therefore, elements common to both examples retain the same element numbers and are not re-introduced. Components unique to the present invention whether by modification or by provision are newly introduced and given new element numbers.

In this example of the present invention, the Internet connection means is the same as described in FIG. 8 above. A user operating PC 175 is connected to modem bank 171, hosted by ISP 145, by virtue of Internet access line 173. Connection server 169, also hosted by ISP 145, facilitates connection to Internet backbone 157 within Internet 141 through Internet access line 167. However, instead of using a general search engine as was illustrated in FIG. 8, a user operating PC 175 is a subscriber to the personalized portal service described in disclosure included herein and referenced as Ser. No. 09/208,740 in the cross-reference section above. As such, a connection is opened to a portal server 179 upon Internet log-in from user premise 147 and a portal page illustrated as PP is served by server 179 and appears within a browser application 178.

Browser application 178 is enhanced for communication with portal server 179 by virtue of provided SW plug-ins (not shown), which are adapted for enabling auto-log-in to personal WEB pages, initiating special tasks to be performed by server 179, among other options which are fully described in the related documents Ser. No. 09/523,598 and Ser. No. 09/208,740. A user operating PC 175 while connected on-line to portal server 179 may interact with the provided PP in browser 178 to search for updated data from one or all of his or her service-registered WEB pages. In this system, portal server 179 is enhanced with a navigation control for browsing on behalf of a user operating PC 175. In general, such navigation and return of data is limited to sites that are known to the service and/or to the user. For example, navigation to sites for data acquisition on behalf of a user is accomplished with site-logic scripting, parsing and data-return techniques known to the inventor and described above. The portal service uses a system of connected nodes to process the many requests from users.

A data store 185 is provided and illustrated as connected to portal server 179 by data link. Data store 185 is adapted to contain and manage data including but not limited to profile and subscription data about users, data about user-registered sites, password and user-names associated with those sites, and navigation scripts for accessing such sites on behalf of users. Data store 185 may be a series of separate data repositories all connected to server 179, or a single repository as represented herein, or a part of portal server 179. Data store 185 may be of any suitable implementation such as an optical storage facility or the like. In this example, server 179 and connected data store 185 are held within Internet 141 with server 179 directly connected to backbone 157. However, in another embodiment, server 179 and data store 185 may be hosted by and held within ISP 145 as represented in FIG. 1.

Three WEB servers (WS) 181a–c are illustrated as connected to backbone 157 in Internet 141. WEB servers 181a–c are adapted as Internet file servers as described in FIG. 7 (WS 159, WS 161). However, in this embodiment each WS 181a–c has at least one main HTML page hosted therein that contains a private search engine (SE) embedded therein as illustrated by associated flags labeled SEa, SEb, and SEc respectively.

An on-line database 187 is provided and illustrated as connected to backbone 157 within Internet 141. Database 187 represents an on-line storage facility containing additional HTML pages hosted by WEB servers 181a–c. Database 187 may be a single data repository shared by servers 181a–c as is represented herein or database 187 may represent a separate database for each of WEB servers 181a–c. Database 187 stores electronic WEB pages that may be accessed through a private SE hosted in any one of or all of servers 181a–c. For example, WS 181a may be hosted by Intel™. As such, electronic pages contained in database 187 represent deeper-level electronic pages containing information related to Intel™ and accessible through SEa hosted at server 181a, but not indexed by a regular SE database such as, perhaps, Altavista™. WS 181b may be hosted by Gateway™ and an embedded SEb, also hosted by Gateway™ may be used to search database 187 for URLs related to Gateway™ such as computer specifications, chip parameters, install instructions, and so on.

It is important to note here that pages having URLs maintained in database 187 cannot typically be accessed through a conventional search method because they represent a deeper level of WEB data not indexed in either data store 153 or data store 155 of FIG. 7. The additional pages are only accessible through use of embedded SE applications found on such as a main electronic page or pages hosted in servers 181a–c, or through manual navigation from one of the main URLs providing links to the deeper-level information. A private SE may be a search function dedicated to providing access to additional technical service-related URLs hosted by an enterprise. The specific SE may be labeled "search our technical service site", for example, and may be configured to search by key word or phrase. The search provided is, of course, limited to enterprise-hosted databases such as database 187.

In a conventional sense (negotiaiting with the server hosting the SE), one would enter a key word or the like into the private SE as described above and would be presented with a list of hyper-links to the additional pages hosted by the enterprise which would appear in a user's browser application. The additional URLs may also be linked by icons found in various electronic pages contained in servers 181a–c and hosted by the respective enterprises. The use of a private SE of the type described herein allows faster access to data and reduced manual navigation time for users.

The inventor herein teaches and provides a unique application extension that enables a seamless bridge between a conventional SE and a private SE. A SW application 183, illustrated as executing on portal server 179, provides such enhanced functionality. In this example, SW 183 is a personalized search function provided by the enterprise hosting server 179 and the portal service, which is available to users typically through subscription. SW 183 may be invoked by a user operating PC 175 at user premise 147 by clicking on an available link presented in a PP (Portal Page) within browser application 178.

Once SW 183 is invoked, a user operating through interface 178 enters a natural language query designed to search for specific data. It is assumed in this example that specific data requested is not contained in any of the URLs for pages registered with the portal service. It is also assumed that the requested data is available in a deeper level of data which may be accessed through use of one or more private SEs hosted by one or more of the user's registered WEB services.

To further illustrate, consider that WS 181a is a Hewlett Packard™ server registered to the portal service by a user operating PC 175. PC 175, in this example, may be a Hewlett Packard™ machine such as a Pavilion™ model machine. A query entered into a PP search dialog box may be, for example, "Bios flash upgrade information for Pavilion". SW 183 parses the entered query and processes the query by checking data store 185 for any related data. It is found that WS 181a (Hewlett Packard™) is a user-registered WEB site and is a likely URL for containing data related to the query. In one embodiment, a user may make a registered URL an integral part of a query command. For example, the query may read "search my HP WEB site for 'Bios flash upgrade information for Pavilion'". The double quotations illustrated in the command query may be used to separate the command portion from the query portion although this is merely exemplary. There are many ways to express command/query combinations.

SW 183 uses a navigation sub-system (not shown), which is known to the inventor, to navigate to HP server 181a on the user's behalf and perform auto-log-in to access a main URL contained in server 181*a* to which the user subscribes. The requested information is not contained in the main URL, but may be available through a private SE embedded in the main URL at server 181*a* (illustrated by flag SEa). SW 183 is, in one embodiment, adapted to recognize the code that identifies the embedded SE and is adapted by software routine to locate and invoke the private SE at the main URL in server 181*a*. In another embodiment, the private SE parameters such as data entry rules are pre-known and are accessible from data store 185.

Once the private SEa is open, SW 183 transfers the original query into the dialog box provided and executes the search function by virtue of automated routine. If required, SW 183 may restructure the query to fit the rules used by the private SE. Data returned by the private SE is gathered by a navigation control and returned to server 179 where it may be forwarded to the portal page (labeled PP in FIG. 8) in browser interface 178. A user may then click on any additional URL listed and navigate to that electronic page hosted in this case at database 187, and view the data.

The search, navigation, and data-return process is transparent to the requesting user as is the auto-log-in process. The next page the user sees is a list of related links to data about "Bios flash upgrade instruction". In some cases, the additional links may appear on the same PP within browser 178 by virtue of an automated linking process known in the art. By clicking on any one of the provided links, a user may navigate to the selected page and view the data contained therein.

SW 183 thus provides a proxy searching function that may be practiced by a user from a single interface and using an original query typed into a first search dialog box. A user practicing this method is not required to manually navigate until he or she is presented with a list of links related to the deeper level data held in database 187 in this example.

It will be apparent to one with skill in the art that the functionality of SW 183 is in part generic to and in accordance with similar capabilities described in the related documents listed under the cross-reference section. Additional components added to SW 183, which provide a novel interface capability between SE applications are detailed further below.

Figure 9:
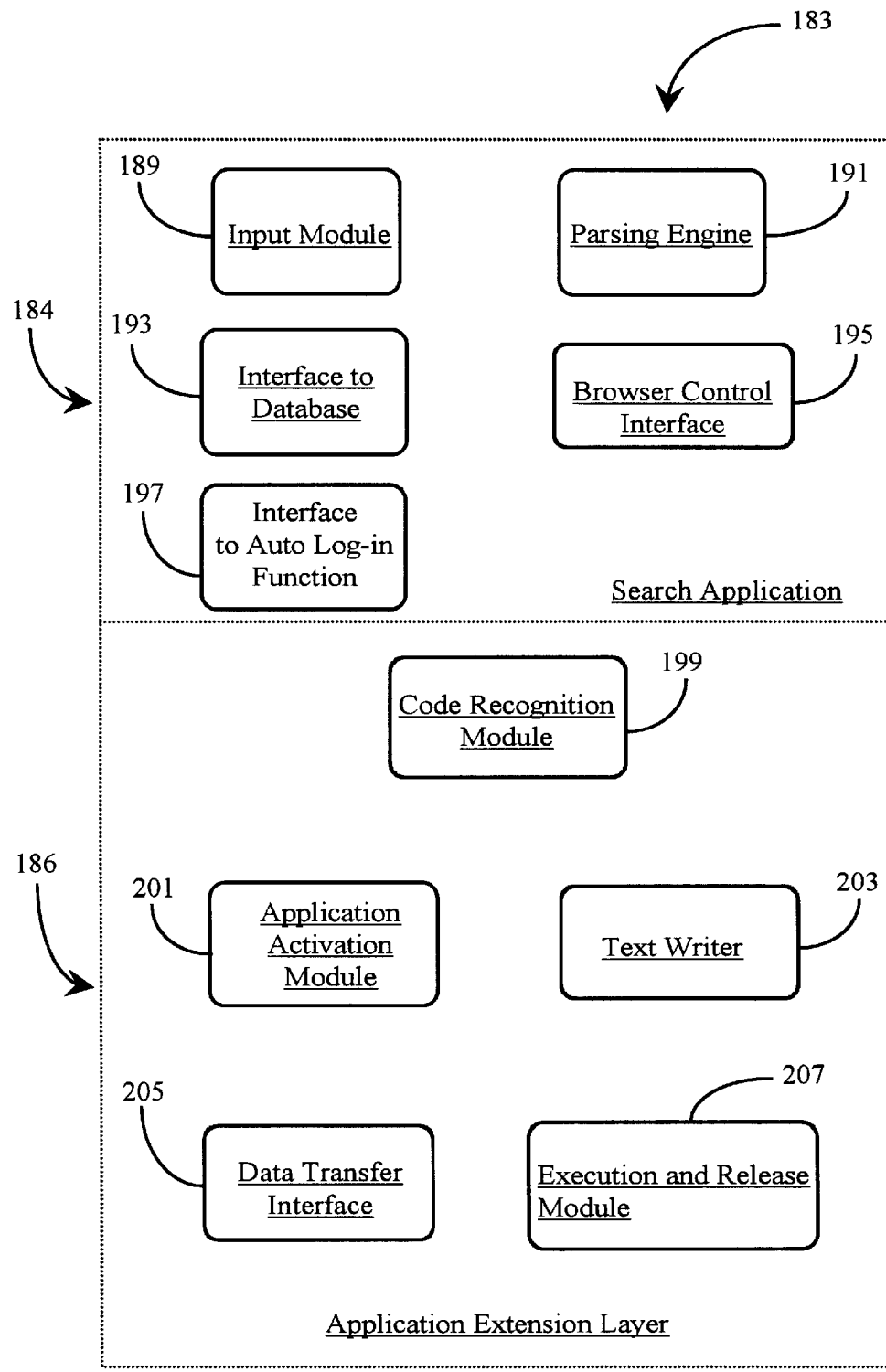
FIG. 9 is a block diagram illustrating software components of a search function interface according to an embodiment of the present invention.

FIG. 9 is a block diagram illustrating exemplary software components of a search-function interface according to an embodiment of the present invention. SW 183 comprises a data-search module 184 and an application-extension layer 186. Search module 184 is similar in many respects to traditional search engines except for the presence of a browser control interface 195, and an interface to auto-log-in function 197.

Control interface 195 is provided and adapted as an enhancement that allows interface to a navigation system for browsing known URLs on behalf of users. Interface 197 is provided and adapted to allow auto-log-in functions to be performed on behalf of a user upon navigation to a user-registered URL for the purpose of obtaining data requested by a user.

An input module 189 is provided and adapted to accept query data input into SW 183 by interfacing users. A parsing engine 191 is provided and adapted to read and understand data queries for purpose of further processing data requests. A database interface module 193 is provided and adapted to allow interface to any connected repository to search for data that may be compared against a query for match. Browser control 195, as previously described, is an interface to a proxy-navigation system. If data matching a query is not found in a connected database, then navigation may be required to obtain the requested data. Auto-log-in services may be performed during navigation to gain access to user-registered sites.

Search application 184, as known to the inventor, is not the same as a traditional search engine used for generic data searches on the Internet. Application 184 is enhanced for integration into the Password-all software suite described in Ser. No. 09/208,740 and the method for obtaining and presenting WEB summaries described in Ser. No. 09/523,598. A basic example of using search application 184 is described in the embodiment of FIG. 5 above. In this embodiment, Auto-log-in is performed during navigation to gain access to user-registered sites, which require a user name and/or password for authentication. Data is found through parsing and site logic scripting. The function of search application 184 assumes that there is sufficient pre-known information available about the data source and data location in the source for successful navigation and parsing.

Application extension 186 is provided to extend the function of application 183 to provided a seamless interface to a second search application which may be specific to an enterprise hosting a WEB site comprising am plurality of pages having URLs. Application 186 enables SW 183, in cooperation with a proxy-navigation system, to navigate to and commandeer the second search engine and cause that engine to search for and return data on behalf of a user.

A code recognition module 199 is provided and adapted to recognize an embedded search function held within a URL opened during proxy navigation. In this way, SW 183 may find any second search function embedded in any URLs subject to navigation and search. In one embodiment, such search functions are pre-located when a user registers a new URL to the service such that their parameters and location may be made part of site-logic scripting.

An application-activation module 201 is provided within extension layer 186 and adapted to invoke or activate an embedded search function. In some cases an embedded search function on will be presented in the form of an icon such that when invoked, a dialog box appears as a pop-up widow or as a new URL. In some cases, a dialog box will already be present and module 201 may not be required.

A text writer 203 is provided and adapted to rewrite an original query into a form accepted by the search dialog criteria associated with the second search function. If required, writer 203 may restructure an original query to fit the new criteria in terms of punctuation, casing, order of words, association of words, and so on. In a Preferred embodiment, such rules are pre-known and are a part of site logic. In an alternate embodiment, writer 203 simply produces the original query for insertion into the dialog box wherein no restructuring is required.

A data-transfer interface 205 is provided and adapted to allow SW 183 to insert an original query into a provided dialog box by known techniques such as object linking and embedding (OLE). An execution and release module 207 is provided and adapted to execute a second search function after a query has been entered. At this point, the data search function is turned over to the new search function, which returns results back to the proxy navigation control. Application extension 186 actively runs in conjunction with the navigation system in integrated fashion to achieve the main object of the present invention, which is to enable a seamless interface between search applications such that a deeper level of data searching may be achieved.

Data returned by the second search function invoked by SW 183 is handled in the same way as described in FIG. 5 steps 111, 113, 115, and steps 117, 119, and 121. Automatic linking capability allows a user receiving requested data links to navigate back to data contained therein. In some cases data located will be returned as text data with no linking required.

It will be apparent to one with, skill in the art that the software components included in SW 183 may be provided to coordinate through interface with a separate proxy navigation system as known to the inventor, or may be functionally provided within the navigation software itself without departing from the spirit and scope of the present invention. In a preferred embodiment, the components described above are Java-based executables designed to function as a routine during Internet navigation.

The method and apparatus of the present invention provides a unique way for users to gain information by proxy from deeper levels of WEB sites without requiring exhaustive manual navigation and repeated re-entering of queries to new search functions.

In one embodiment of the present invention, more than one secondary search function, perhaps associated with more than one URL may be invoked simultaneously such that data returned to the gathering agent is from several different sources or sites.

Figure 10:
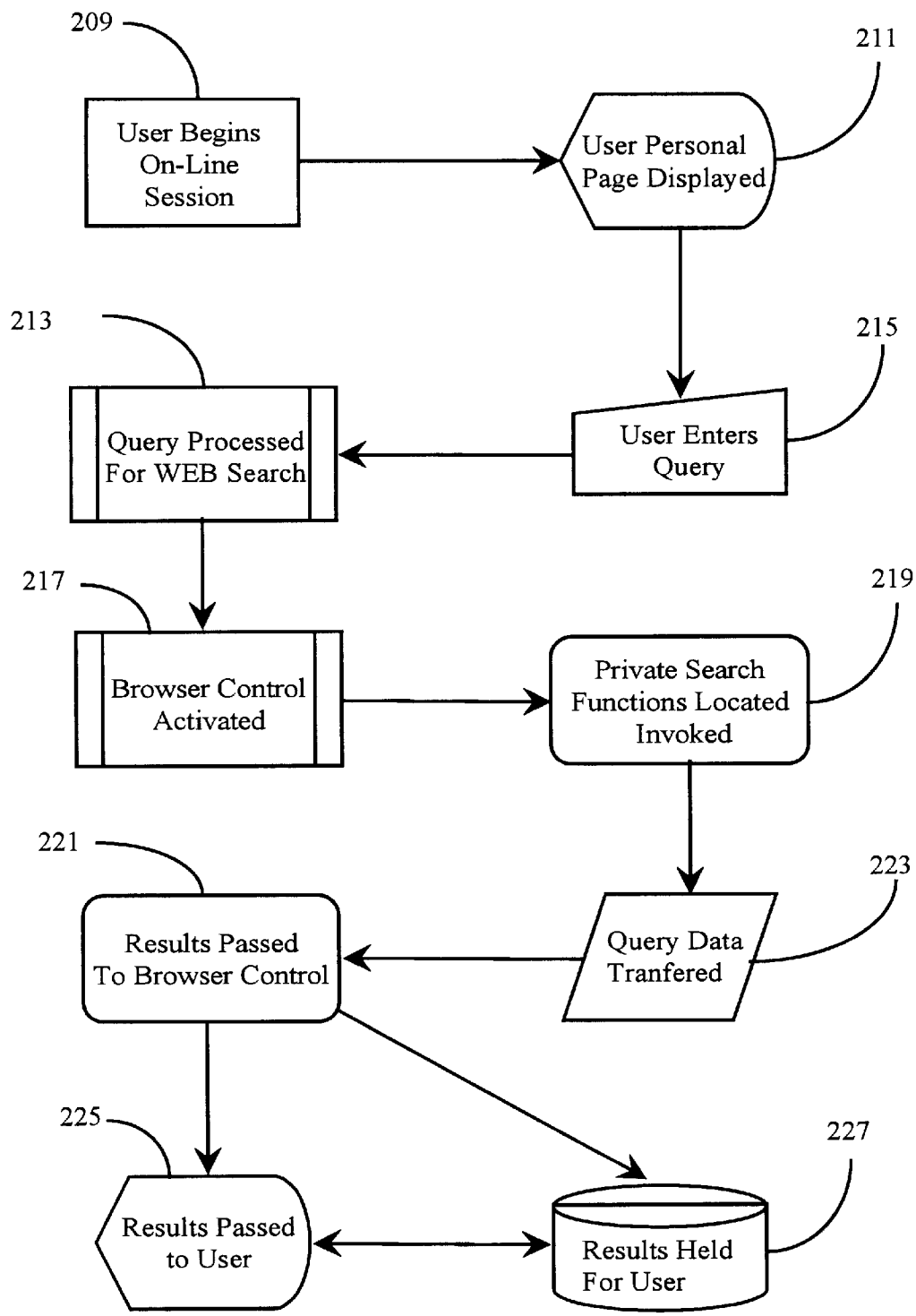
FIG. 10 is a process flow diagram illustrating basic interaction steps for practicing the present invention according to a preferred embodiment.

FIG. 10 is a process flow diagram illustrating basic interaction steps for practicing the present invention according to a preferred embodiment. At step 209, a user begins an on-line session with a portal server as exemplified in FIG. 8. During this process, a user-name and password pair is submitted to a portal server by a user for authentication purposes. After authentication of a user, a personal portal page (PP of FIG. 8) is displayed in a user's WEB browser at step 211. In this step, a dialog box for SW 183 will appear in some convenient location on the portal page.

At step 215, a user enters a query for a data search. The query may be entered in a natural language as previously described in the example of FIG. 8. At step 213, SW 183 processes the query for a WEB search. During this process, any connected databases are consulted for matching data before navigation is initiated. If the required data is contained in a connected database, navigation and proxy searching may not be required. For example, if a user requests data about "technical specifications for white diamonds", then a first "look" into a database may return a user-registered site about diamonds and other minerals. The URL would match the user's query but the exact data may not be found on the URL page.

Assuming that no matching data is found, navigation to the related URL is initiated through browser control interface at step 217. Proxy navigation to the URL or URLs that most closely relate to a user query is performed by a navigation sub-system. Auto-log-in is performed if required for entry into a site.

At step 219, any private search functions associated with the site and available on the main URL page or pages are located and invoked. At step 221, original query data entered at step 215 is transferred to a new dialog box associated with a new search function. At this point, the search is handed over to the respective WEB site or sites. At step 223, data results from the secondary search, which may be in the form of text, additional URL links, or a combination thereof, are passed back to the navigation control. These results represent data that could not have been obtained through conventional search methods because such methods are limited to a first WEB-site depth.

If a user requires immediate data return, the results are passed back to the user's WEB browser at step 225. If a user will access the results at a later date, then the results may be held in storage on behalf of the user at step 227.

It will be apparent to one with skill in the art that the basic process-interaction steps represented herein may be expanded in description without departing from the spirit and scope of the present invention. For example, step 209 may include sub-steps such as supplying password and user name for authenticating. A step for invoking an original search application may be provided between steps 211 and 215 if an open dialog box does not appear with the served portal page (PP). There are many possibilities. The inventor intends that the process steps represented herein are only exemplary of one suitable process among many for practicing the present invention.

It will also be apparent to one with skill in the art that SW 183 of FIG. 9 may be a standalone application with appropriate interface capability to a navigation sub-routine without departing from the spirit and scope of the present invention. In still another embodiment, application 183 may be integrated with a navigation sub-routine such that navigation capability is part of the direct functioning of SW 183.

The method and apparatus of the present invention may be practiced in a personalized sense as is described in previous embodiments wherein URLs are registered to users and auto-log-in services are performed on behalf of users subscribing to portal services.

In another embodiment, the method of the present invention including proxy navigation capabilities may be provided as an extension to existing and well-known search engines that are provided to the public without subscription. Such search engines are typically used to search for more generalized data, and users do not have pre-knowledge of where requested data is held. A general search engine executing from a server may, if enhanced with the SW of the present invention, provide a deeper level of data searching than is currently offered. Such an embodiment is detailed below.

Figure 11:
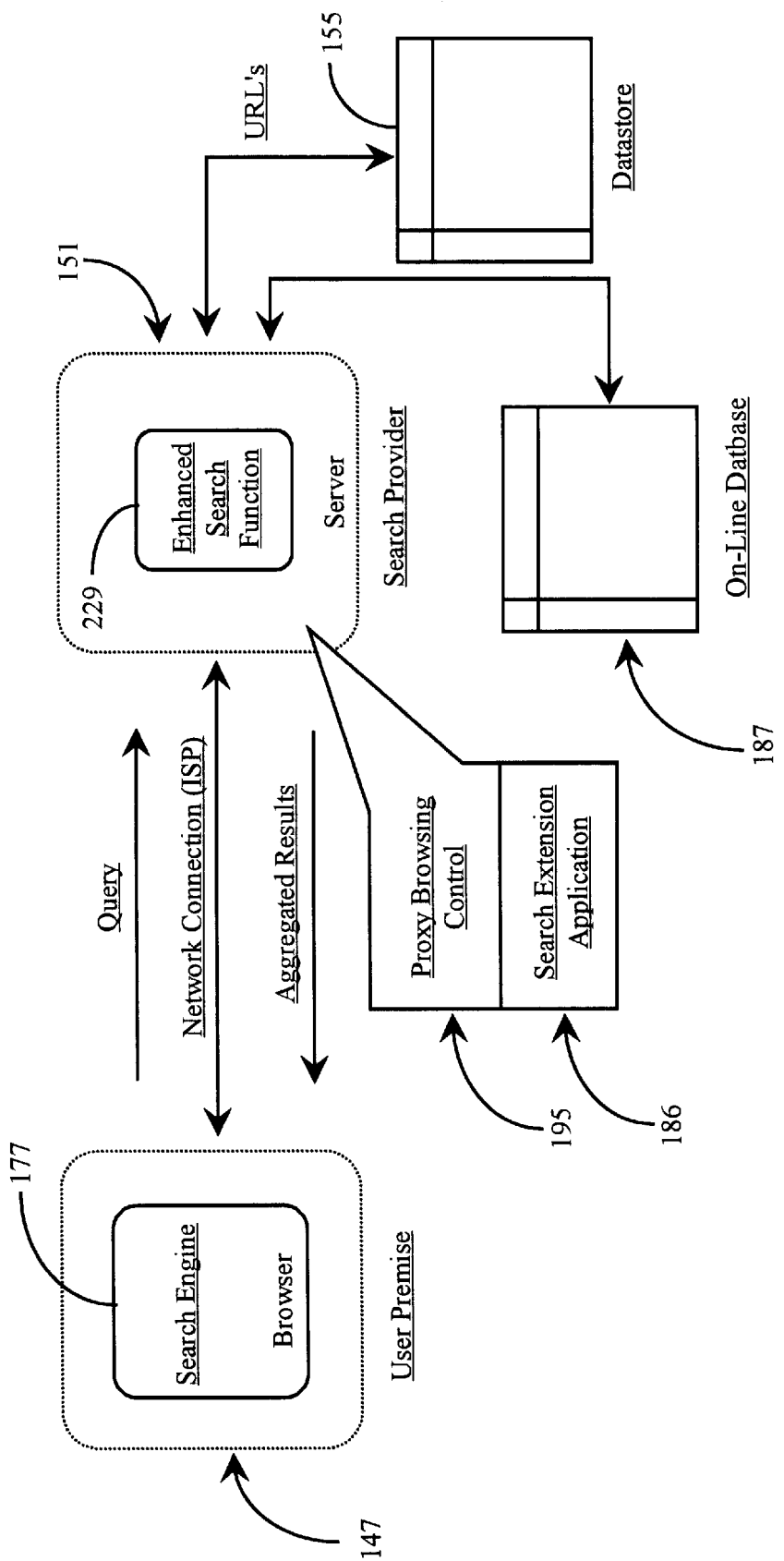
FIG. 11 is a block diagram illustrating the standard data-search system of FIG. 7 enhanced with the method and apparatus of the present invention according to an alternate embodiment of the present invention.

FIG. 11 is a block diagram illustrating the standard data-search system of FIG. 7 enhanced with the method and apparatus of the present invention according to another embodiment of the present invention. In this example, user premise 147 is enabled by virtue of browser application 177 to browse the Internet as described in FIG. 7. A standard search engine is illustrated within browser 177 and is an interface to search-provider (SP server) 151. User premise 147 has connection to server 151 by virtue of an ISP-brokered network-connection illustrated herein by the double arrow labeled "Network Connection (ISP)". Such a connection is analogous to the compilation of lines 173 and 167 of FIG. 7.

Server 151 has an enhanced search engine 229 executing thereon and adapted to allow added services according to an embodiment of the present invention. For example, engine 229 is enhanced with addition of a proxy browsing control 195, which allows interface to a general version of the personalized navigation system described above. What is meant by "a version of" is that no site logic is employed to look for specific data known to exist.

Search engine 229 is also enhanced with a "generalized version" of the personalized application 186 of FIG. 9. Meaning that there is no interface for auto-log-in. Application control 195 and extension 186 may be provided with a navigation sub-routine and integrated into a standard search engine (SE) producing the enhanced engine 229.

Alternatively, engine 229 has a navigation control or interface to a separate browsing sub-system, which may run on the same server (151), or another connected server or set of servers.

Server 151 accepts a query from user 147 running application 177 and using a search engine (SE) interface. The query may be a general request for data about a certain class of IC chips, for example. The query may contain keywords or a series of keywords describing the desired chips. Alternatively, a phrase may be entered instead of keywords. This depends on any rules that are in place and observed by SW 229. In normal operation, SW 229 retrieves URLs containing any data matching the user's query as illustrated by the right-angled, double arrow labeled "URLs" placed between server 151 and data store 155. Data store 155 contains indexed URLs that may contain data that matches a user query.

In this example, such URLs are, as would be the normal case, returned to user premise 147 over the network connection where they appear in a displayed search page within browser window 177. A user may then select a return link to navigate to the electronic page indexed by the URL link.

Some of the URLs indexed in data store 155 may contain embedded search functions representing private search capabilities along with data matching the criteria of the original query. Those URLs may be automatically assigned for proxy browsing on behalf of the user wherein control 195 and extension 186 are employed to navigate to the pages on behalf of a user and invoke the secondary search engines to return deeper level data or URLs according to the original query. In this case, the interface to auto-log-in function 197 would not be required and no site-logic scripts are used. However, all of the other described modules of FIG. 9 may be employed. Many URLs having private search functions embedded therein may be found during the initial search. Therefore, there may be a rule administered that limits the number of private search engines that may be invoked on behalf of a user. An example of such a rule may be "navigate to only the top ten URLs that match the query by ranking percentage and invoke deeper level searches according to the original query".

In another embodiment, URLs found to contain private search functions are sent back to user premise 147 along with other matching URLs or "hits" and appear in browser 177, but are listed separately. In this case, a user may select a number of those URLs (containing search functions) for proxy navigation, search execution, and data return. Returned data may, in some cases be delivered as text instead of additional links for manual navigation. In this case, the process would contain an extra step of a user selecting a number of returned URLs containing search functions, and then submitting the selection to SP server 151 for proxy navigation, data search, and data return. Selection may, in some cases, be facilitated by check boxes presented next to each URL. Checking a box indicates to include this URL in proxy navigation.

On-line database 187, as previously described in FIG. 7, represents a repository or repositories held by individual WEB sites such as sites 159 and 151 of FIG. 7. Data and URL links contained in database 187 represent deeper-level WEB site data available through a private search function or through manual link activation and navigation from a main URL. The method and apparatus of the present invention provides a convenient method for searching and returning data held on a deeper level of WEB site depth without requiring a user to manually navigate to the data from a "jump-off page" or, without manually invoking a private search function and entering an additional query to search for the data.

In the embodiment presented herein, it is noted that the exact parameters pertaining to rules for entering queries into private search functions is not pre-known as the system described in this embodiment is not personalized to a user. Therefore, re-structuring of an original query may not be possible. However, it is assumed that some standardization exists with respect to the code used to embed the private search functions as well as with the rules administered for dialog entry into those functions. SW 229 may be pre-programmed then to understand and recognize such standard parameters such that recognition of code and restructuring of a query is still possible. In this instance, known codes and rule-sets would be pre-loaded into a database accessible to SW 229 such that the correct codes and rule-sets may be found by parsing and comparison.

It will be apparent to one with skill in the art that SW 229 may be adapted to work in conjunction with a navigation system in a multi-tasking environment without departing from the spirit and scope of the present invention. For example, many user queries may be processed simultaneously and the only limit to the number of URLs that may be navigated to on behalf of a plurality of users is the processing power of the dedicated node or nodes performing the navigation and data-return functions. In another embodiment, SW 229 and a navigation system may be one application running on one powerful server. Scalability and component distribution may be implemented according to need. There are many possibilities.

The method and apparatus of the present invention may be practiced via private individuals on the Internet, businesses operating on a WAN connected to the Internet, businesses operating via private WAN, and so on. There are many customizable situations.

The present invention as taught herein and above should be afforded the broadest of scope. The spirit and scope of the present invention is limited only by the claims that follow.

What is claimed is:

1. A method for extending an on-line Internet search beyond pre-referenced sources, comprising steps of:
    (a) entering a first search criteria in a first search function;
    (b) initiating the first search function;
    (c) returning in the first search function a pre-referenced first document having data associated with the first search criteria;
    (d) testing the first document for an embedded second search function;
    (e) on finding a second search function in the first document, automatically entering at least a form of the first search criteria in the second search function; and
    (f) returning addresses in the first search function for documents found through the second search function.

2. The method of claim 1 wherein the first search function allows natural language in entering search criteria, and further comprises a parsing step for parsing criteria input for significant words and phrases for criteria matches.

3. The method of claim 2 wherein the first search function, in step (e), tests the second search function for criteria rules, and amends the first search criteria to conform to the criteria rules.

4. The method of claim 1 wherein the first search function is provided by a subscription portal service, and is operated by proxy by subscribers.

5. The method of claim 4 wherein the first search function is limited in step (c) to returning first documents pre-registered to a specific subscriber invoking the first search function.

6. An Internet search application comprising:

a first search module having a first criteria interface for entry of a first search criteria;

an inspection function for identifying a second search module in a returned electronic document, the second search module having a second criteria interface; and an entry module for entering the first search criteria into the search criteria interface of the second search module;

characterized in that the search application, upon entry of a first search criteria in the first criteria interface, returns at least one electronic document having a match to the first search criteria, inspects the document for the second search module, and transfers at least a form of the first search criteria into the second criteria interface.

7. The Internet search application of claim 6 wherein the Internet search application further initiates the second search module after transfer of search criteria, and returns at least addresses of documents found by the second search function in the first search function.

8. The search function of claim 6 wherein the first search module allows natural language criteria entry, and parses entries for significant words and phrases for matching to content in electronic documents returned.

9. The search function of claim 8 wherein the first search module, in step (e), tests the second search module for criteria rules, and amends the first search criteria to conform to the criteria rules.

10. The search function of claim 6 wherein the first search module is provided by a subscription portal service, an is operated by proxy by subscribers.

11. The search function of claim 10 wherein the first search module is limited to returning first documents pre-registered to a specific subscriber invoking the first search function.

* * * * *